United States Patent [19]

Bargout et al.

[11] Patent Number: 5,867,570
[45] Date of Patent: Feb. 2, 1999

[54] DIRECTORY NUMBER PORTABILITY IN TELEPHONE NETWORKS

[75] Inventors: Mahmoud N. Bargout, North York; Adrian Giuhat, Nepean; Edgar Martinez, Ottawa, all of Canada; Sonu Mirchandani, Norcross, Ga.

[73] Assignee: Northern Telecom Limited, Montreal, Canada

[21] Appl. No.: 690,474

[22] Filed: Jul. 29, 1996

[51] Int. Cl.$^6$ .................................................. H04M 7/00
[52] U.S. Cl. .......................... 379/207; 379/220; 379/230; 379/211
[58] Field of Search .................................. 379/207, 229, 379/220, 221, 201, 210, 211, 212, 230

[56] References Cited

U.S. PATENT DOCUMENTS

| | | | |
|---|---|---|---|
| 5,430,719 | 7/1995 | Weisser, Jr. | 370/389 |
| 5,566,235 | 10/1996 | Hetz | 379/207 |
| 5,581,610 | 12/1996 | Hooshiari | 379/133 |
| 5,664,102 | 9/1997 | Faynberg | 379/207 |

FOREIGN PATENT DOCUMENTS 2153281  1/1996  Canada .

OTHER PUBLICATIONS

J.J. Lichter, "Generic Switching and Signaling Requirements for Number Portability", Generic Requirements, Issue 1.024 Jun. 17, 1996, pp. 1–76.

*Primary Examiner*—Ahmad F. Matar
*Attorney, Agent, or Firm*—Foley & Lardner

[57] ABSTRACT

Portability of directory numbers in telephone networks, particularly so-called intelligent networks, may be provided without modification of the call processing software at originating network node switches, by associating each call to a ported number with an Initial Address Message comprising a Location Routing Number for the recipient switch as the Called Number and the ported directory number as the Original Called Number. At a boundary with a network which uses a Location Routing Number, a Generic Address Parameter and a Forward Call Indicator flag for identifying calls to ported numbers, a network element creates a modified routing message by converting the Original Called Number to a Generic Address Parameter and setting a Forwarded Call Indicator flag to indicate a translated originally-dialled called number. The network element then uses the converted Initial Address Message to route the call into the second network. Public Office Dialling Plan or Termination Attempt triggers may be used to interrupt processing of a call to the ported number and initiate a query to a Service Control Point database for the corresponding Location Routing Number for inclusion in the Initial Address Message. Alternatively, call forwarding at the donor switch may be used to provide the Location routing Number for the originating switch to include in the Initial Address Message.

7 Claims, 2 Drawing Sheets

DIRECTORY NUMBER PORTABILITY IN TELEPHONE NETWORKS

TECHNICAL FIELD

The invention relates to telephone systems and, in particular, to so-called "number portability" whereby a subscriber may retain the same directory number when transferring from one service provider to another or changing from one type of service to another, such as from wireless to landline or from business to residential.

BACKGROUND ART

The invention is applicable to telephone systems which are known as "Intelligent Networks" (IN) or "Advanced Intelligent Networks" (AIN) and which employ out-of-band signalling systems such as Signalling System No. 7 (SS7), also known as Common Channel Signalling No. 7 (CCS7). Such signalling systems exchange Transaction Capabilities Application Part (TCAP) messages or queries between network node switching elements to set up and route calls. The TCAP and ISUP messages are handled by a data communications system separate from the trunks which carry the calls themselves. The elements of such intelligent telephone systems include Service Switching Points (SSPs) interconnected by trunks for carrying calls, and Signal Transfer Points (STPs) and Service Control Points (SCPs) connected to each other and the SSPs by SS7 data links for carrying signalling. A Service Control Point is an "intelligence centre" with access to application databases enabling it to deliver various combinations of features, such as 1-800 number service and call redirection. A Signal Transfer Point (STP) is a signalling hub or concentrator, typically connecting several Service Switching Points to an SCP. A Service Switching Point (SSP) is a network node normally associated with a central office switch equipped with Signalling System Number 7 (SS7) messaging links to permit communication with the SCPs and which has special AIN call processing software including a plurality of "Point-in-Call triggers" which can be provisioned or set to interrupt call processing momentarily and initiate a TCAP query to the SCP for instructions on how to complete the call processing. Based upon the instructions, the originating end office seizes a trunk to a neighbouring switch and creates an Initial Address Message which it sends to the neighbouring switch via the signalling network. The Initial Address Message includes various parameters which will control routing of the call to its destination.

In circuit-switched telephone systems, each subscriber has a unique public directory number which is associated with a particular circuit of a switch at the subscriber's local office. As a general rule, if the subscriber transfers to a new service provider, the subscriber is assigned a new public directory number. For various reasons, it is desirable for a subscriber to be able to change service provider while keeping the same public directory number and any specific service features associated with it.

Various "local number portability" schemes have been proposed for "porting" a subscriber's directory number to a different switch and routing calls to it automatically, so that other subscribers may dial the same public directory number and still reach the subscriber, without knowing that the ported number is at a different switch. Procedures for achieving such "local number portability" were promulgated in a document entitled "Generic Switching and Signalling Requirements for Number Portability", Illinois Commerce Commission Workshop on LNP, Illinois, April 1996.

The former document proposes that, when a directory number is ported to a different switch, an entry will be made in the SCP database linking the ported directory number with the Location Routing Number of the recipient switch, i.e. the switch to which the subscriber transferred. Each originating end office will be notified that a number (NPA-NXX) from the "donor" office had been ported and will set a trigger to query the SCP for instructions when trying to route any subsequent calls to that NPA-NXX. It is preferred to set a trigger which will be actuated by any directory numbers beginning with that NPA-NXX rather than set a trigger for each individual ported directory number. The SCP will return the Location Routing Number of the recipient switch. The originating switch will incorporate the Location Routing Number and the original dialled digits into a special Initial Address Message and route the call to the recipient switch, which will complete the call to the "ported" subscriber. The Initial Address Message is termed "special" because it will have the Location Routing Number in place of the usual "Called party number" and the original dialled digits (called number) as a parameter called the "Generic Address Parameter". This Generic Address Parameter is defined in Bellcore GR-317-CORE. At the recipient end office switch, the presence of the Location Routing Number (which cannot be dialled by a subscriber) in place of the called number will prompt the switch to look to the Generic Address Parameter for the called number to which the call should be completed. Such an arrangement entails modifications to the SCP software, which is not particularly expensive because the SCPs are relatively few in number. A major disadvantage of this procedure, however, is that it requires every SSP in the network to be modified to give it the capability of creating the special Initial Address Messages and understanding those it receives. This entails considerable expense since there might be several hundred SSPs in the network.

SUMMARY OF THE INVENTION

The present invention seeks to eliminate, or at least mitigate, the disadvantages of the previous proposal and has for its object to provide an improved method and apparatus for effecting number portability in a telephone network, particularly a so-called intelligent network, without requiring modification of the call processing software at originating network nodes or central office switches.

According to one aspect of the present invention, there is provided a method of effecting directory number portability in a telephone network having a plurality of network nodes each having a unique network address and using out-of-band signalling for call setup and routing, such signalling system employing initial address messages for controlling routing of the calls, such initial address messages including selected one of a Called Party Number, an Original Called Party Number, a Generic Address Parameter Number and a Forwarded Call Indicator, a method enabling routing of a call to a directory number that has been transferred from a donor switching unit at a donor network node in said telephone network to a recipient switching unit at a recipient network node in a different network controlled by a different service provider, the method including the steps of:

(i) in the telephone network, associating with a call to the ported directory number an Initial Address Message comprising the network address of the recipient network node as the Called Number and the ported directory number as the Original Called Number:

(ii) at a boundary between said telephone network and said different network, converting the initial address message by making the Original Called Party number a Generic Address Parameter and setting Forwarding Call Indicator flag to indicate that the Called Number as originally-dialled has been translated; and (iii) routing the call into said different network using the converted Initial Address Message.

Where the telephone network comprises switching units having Point-in-Call triggers, specifically public Office Dialling Plan triggers for interrupting call processing and initiating queries to a Service Control Point having access to a central database, the method may further comprise the steps of, when the directory number is ported to the recipient network node, making an entry in said central database linking the ported directory number with the network address of the recipient network node and setting Public Dialling Office Plan (PDOP) triggers at switching units at originating network nodes. The step of associating the Initial Address Message with a call to the ported directory number may then include the steps of interrupting call processing at the PODP trigger in the switching unit of the originating node, querying the central database with the ported directory number, retrieving from the database the corresponding network address of the recipient node and, upon receipt of the network address at the switching unit of the originating network node, assembling said initial address message.

Alternatively, instead of a PODP trigger being set at the originating offices, a Termination Attempt Trigger (TAT) may be set at the switching office of the donor network node. When a call to the ported directory number is received by the switching unit at the donor network node, the TAT trigger causes a query to the central database to retrieve the network address, which is returned to the originating network node switching unit for inclusion in the Initial Address Message.

Another alternative is to use a switch based call forwarding feature at the donor network node switching unit to redirect calls to the ported number with the network address as the number to which the call is to be redirected.

According to one preferred embodiment of the first aspect of the invention, the method includes the steps of, upon transfer of the directory number from a switching unit at the donor network node to a second switching unit at the recipient network node;

(i) storing at a database associated with a central network control unit date linking the directory number with a network address of the recipient network node;

(ii) setting at each originating network node switching unit a trigger actuable when the originating network node switching unit is required to process a call to the ported directory number, the trigger causing a query to be sent the central network control unit;

when subsequently one of said originating network node switching units attempts to place a call to the ported number;

(iii) at said originating network node switching unit, interrupting call processing upon actuation of said trigger and sending to said central network unit a signalling message including said ported directory number;

(iv) at said central network unit, determining whether or not said directory number is present in said database and, in the event that it is present, returning to said originating network node switching unit said network address of said recipient network node;

(v) at said originating network node switching unit, construction an initial address message with the network address as the called party number and the ported directory number as the original called number and routing the call to a network access element;

(vi) at the network access element, converting the initial address message by making the Original Called Party number a Generic Address Parameter and setting a Forwarded Call Indicator flag to indicate that the Called Number as originally-dialled has been translated; and (vii) routing the call into the second network using the converted initial address message.

According to a second aspect of the invention, there is provided a telephone network having a plurality of network nodes each having a unique network address and an out-of-hand signalling system for call setup and routing, such signalling employing initial address messages for controlling routing of the calls, such initial address messages including selected ones of several parameters, including a Called Party Number, and Original Called Party Number, a Generic Address Parameter Number and a Forwarded Call Indicator, the telephone network enabling routing of a call to a directory number that has been transferred from a first network node in said telephone network to a second network node in a second network controlled by a different service provider and comprising:

(i) means for associating with a call to the ported directory number an initial address message comprising the network address of the second network node as the Called Number and the ported directory number as the Original Called Number;

(ii) an access element controlling access between the telephone network and the different network and comprising means for converting the initial address message by making the Original Called Party number a Generic Address Parameter and setting a Forwarded Call Indicator flag to indicate that the Called Number as originally-dialled has been translated; and means for routing the call into the second network using the converted initial address message.

Various other objects, features and advantages of the present invention will become apparent from the following description, taken in conjunction with the attached drawings, of a preferred embodiment of the invention which is described by way of example only.

DESCRIPTION OF THE PREFERRED EMBODIMENT

Figure 1:
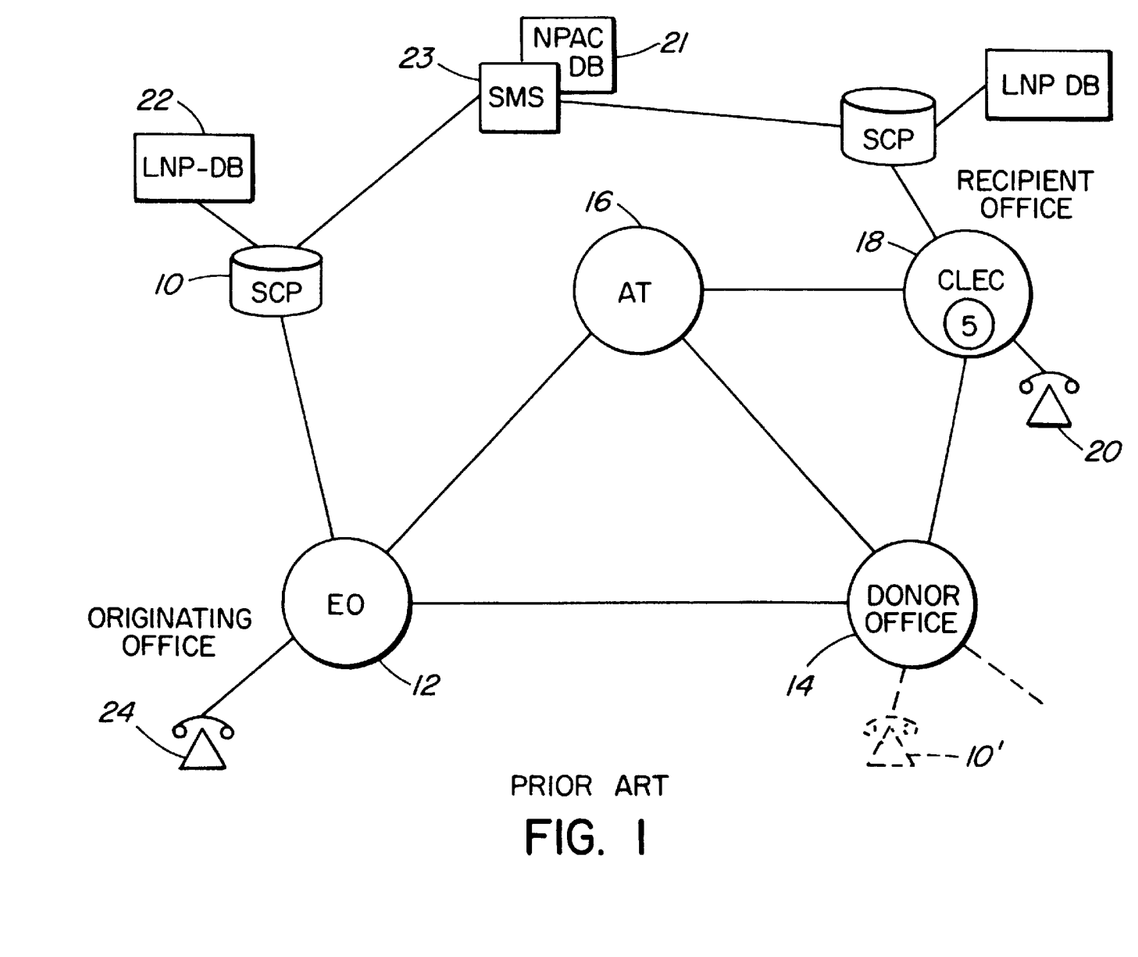
FIG. 1, labelled PRIOR ART, illustrates schematically a portion of an Advanced Intelligent Network implementing Location Number Portability in accordance with a previously-proposed procedure.

A so-called "Originating LRN" procedure for local number portability, proposed in the Illinois document referred to above, will first be described with reference to FIG. 1 which shows, in much simplified form, a portion of an Advanced Intelligent Network comprising a Service Control Point (SCP) 10 and three Service Switching Points (SSPs) 12, 14 and 16. Each SSP comprises a switching unit with SS7 signalling or message links and AIN software enabling it to communicate with the SCP 10 by means of TCAP messages to ascertain how to process a particular call and with other SSPs by means ISDN User Part Initial Address Messages (ISUP-IAM) to set up trunk connections for the calls. For simplicity, only the signalling link between SSP 12 and the SCP 10 is shown. Parameters of Initial Address Messages are set out in Table I below, which is extracted from "Generic Requirements for Call Control Using ISDNUP", GR-317-CORE, Issue 1, February 1994.

TABLE A-4

Initial Address Message

| Parameter | Reference Section | Type | Length (octets) |
| --- | --- | --- | --- |
| Message type | B.11 | F | 1 |
| Nature of connection indicators | B.12 | F | 1 |
| Forward call indicators | B.10 | F | 2 |
| Calling party's category | B.5 | F | 1 |
| User service information | B.2 | V | 4 |
| Called party number | B.3 | V | 4–11 |
| Calling party number | B.4 | O | 5–12 |
| Hop counter | B.21 | O | 3 |
| Charge number | B.23 | O | 3–9 |
| Originating line information | B.24 | O | 3 |
| Carrier identification | B.25 | O | 5 |
| Jurisdiction information | B.26 | O | 2–5 |
| Original called number | B.27 | O | 5–12 |
| Redirecting number | B.28 | O | 5–12 |
| Access transport | B.29 | O | 3–7 |
| Generic address | B.30 | O | 6–13 |
| Generic name | B.31 | O | 3–18 |

A fourth SSP 18, shown connected to SSPs 14 and 16, is depicted as belonging to a network controlled by a different entity, in particular a Competitive Local Exchange Carrier (CLEC). A "ported" subscriber is depicted by a telephone set 20 associated with "recipient" SSP 18, having previously been associated with "donor" end office SSP 14, as depicted by a telephone set 10' depicted in broken lines.

In accordance with the Illinois proposal, when the subscriber moves, the service provider receiving the subscriber at recipient SSP 18 notifies a (proposed) Number Portability Administration Center (NPAC) 21, accessible by the TELCO's and LEC's Service Manager System(s) (SMS). For particulars of the proposed notification procedure, the reader is directed to Illinois Commerce Commission documents LNP NPAC Interface Requirements for Number Portability. The SMS 23 instructs the SCP 10 and each end office in the TELCO network. The SCP 10 makes an entry in its LNP-DB database 22 using the ten-digit "ported" directory number, for example 613 763 1111, as a pointer for the ten-digit Location Routing Number for the recipient switch 18, for example 518 763 0000. It should be noted that this is not a directory number, although it is similar. Each originating end office SSP arms a "trigger" in its Public Office Dialling Plan (PODP) table (not shown) so that, subsequently, the SSP will interrupt any calls to numbers beginning with 613 763 and query the SCP 10 for instructions for completing the call.

When a caller 24 at SSP 12 dials the ported directory number, the PODP trigger at SSP 12 initiates a query to the SCP 10, sending it the ten digits that were dialled, i.e. the ported directory number 613 567 1111. When the SCP 10 receives them, it determines whether or not that directory number is in its LNP database. If it finds no such entry, it returns the same ten digits to the SSP 12. On receipt of the same ten digit number that it sent, the originating SSP 12 recognizes that the dialled number has not been ported, places the ten dialled digits in the Initial Address Message (IAM) as the "Called Party Number" parameter, and routes the call in the normal way.

If the SCP 10 finds the dialled digits in its LRN-DB table 22 as a pointer to a Location Routing Number (LRN), it returns the ten-digit LRN number to the SSP 12 instead of the original ten dialled digits. When the originating SSP 12 receives a different set of ten digits, it formulates a special ISDN User Part Initial Address Message (ISUP IAM), inserting the ten digits of the LRN as the "Called Party Number" parameter and the original dialled digits, i.e. the ported directory number, as the Generic Address Parameter (GAP). In addition, the SSP 12 sets one of a plurality of flags in a Forwarded Call Indicator (FCI) parameter of the IAM, to show that the originally-dialled called number has been translated. The set FCI flag will ensure that, when the call is routed, any intervening SSPs will not query the SCP 10 for further instructions. The SSP 12 then routes the call to the recipient SSP 18 using the LRN-IAM. When the recipient SSP 18 receives the call, it will recognize from the associated IAM that the "called party number" is its own LRN and will use the GAP as the actual directory number to which to complete the call. The recipient SSP may generate a query to its own SCP (not shown) to obtain instructions to complete the call to the number given in the GAP, i.e. the ported directory number, or use its own look-up tables, for example, to find the specific circuit to which this ported number was assigned and complete the call.

Hitherto, in existing (Advanced) Intelligent Networks, the originating SSPs did not have the capability to formulate the special Interim Address Messages required by the above-described Location Number Portability Procedure, so the call processing software at the originating Service Switching Point switches must be modified to provide this capability. Such modifications are perceived to be complex and financially expensive.

An embodiment of the present invention, which provides an alternative approach avoiding such costly modifications to the SSP switch software, will now be described with reference to FIG. 2. Briefly, the invention uses a Signalling Mediation Server to formulate the LRN-IAM messages rather that the SSP switches. The LNP SCP continues to determine the Location Routing Number (LRN) associated with a ported directory number.

In Advanced Intelligent Networks, the Signalling Mediation Server or Point (SMP) comprises, in essence, a Signal Transfer Point provided with Mediated Access software. The SMP controls access to a telephone company's network by third parties via an associated tandem or terminating node or end office controlled by the SMP, Various forms of mediated access have been promulgated, such as:

Access to the SSP using AIN 0.0 mediation
  Access to the SSP using AIN 0.1 mediation
  Access to the signalling network using protocol conversion of call set up message (also known as ISDN User Part mediation) to and from the telephone company/Local Service Provider network.

Figure 2:
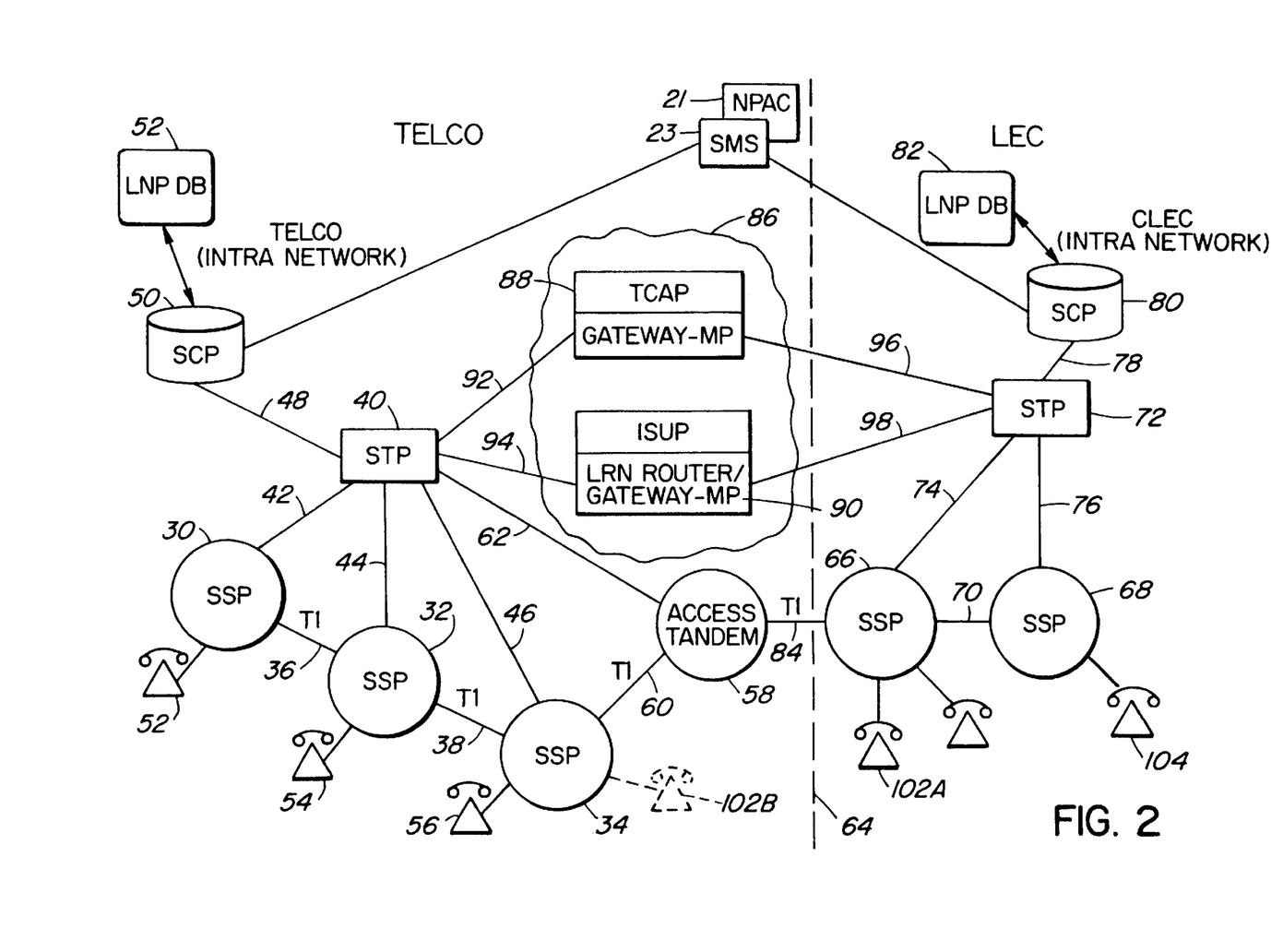
FIG. 2 illustrates schematically a portion of an Advanced Intelligent Network implementing Location Number Portability in accordance with the present invention.

Referring now to FIG. 2, an advanced intelligent network operated by a telephone company TELCO comprises three SSPs 30, 32 and 34 interconnected by T1 trunks 36 and 38, respectively, for voice calls and connected to a Signal Transfer Point 40 by SS7 signalling links 42, 44 and 46, respectively. The Signal Transfer Point 40 is connected by way of an SS7 link 48 to a Signal Control Point 50 which has access to a database 52 for entries relating to directory numbers ported from or to the TELCO network, as will be described in more detail later. The database 52 may be at or remote from the SCP 50.

Each of the SSPs 30, 32 and 34 comprises an originating switching unit with subscribers represented by telephone sets 52, 54 and 56, respectively. An Access Tandem switch 58 is connected to SSP switch 34 by a T1 trunk 60 and to Signal Transfer Point 40 by an SS7 link 62. The Access Tandem SSP 58 provides access to the TELCO network for calls from a neighbouring network of, for example, a Competitive Local Exchange Carrier (CLEC). For convenience of illustration, the CLEC network is shown segregated from the TELCO network by a boundary line 64. The CLEC network comprises SSPs 66 and 68 interconnected by trunk 70 and connected to an STP 72 by SS7 links 74 and 76, respectively. The STP 72 is connected by a link 78 to the CLEC's own SCP 80, which has access to the CLEC's LNP database 82. SSP 72 is also connected to Access Tandem SSP 58 by a trunk 84 for calls passing between the two networks.

Access to the TELCO network is controlled or mediated by a Signalling Mediation Server 86, which comprises a TCAP module 88 and an ISUP module 90 connected to the TELCO Signal Transfer Point 40 by way of SS7 links 92 and 94, respectively, and to the CLEC STP 72 by links 96 and 98, respectively. The TCAP Mediation Point module 88 handles TCAP messages passing between the TELCO STP 40 and the CLEC STP 72. For details of a suitable TCAP Mediation Point module 88, also referred to as an AIN Gateway - MP, the is directed to Canadian laid-open patent application number 2,153,281 which is incorporated herein by reference. A corresponding U.S. patent application is copending under Ser. No. 08/272,207 filed Jul. 8, 1994.

The ISUP Mediation Point module 90 handles ISUP IAM messages between the two networks and controls access to the TELCO network from the CLEC network for calls via T1 trunk 98 and Access Tandem SSP 58. In the CLEC network, SSPs 66 and 68 have subscribers represented by telephone sets 103 and 104, respectively.

A telephone set 102A shown connected to CLEC Signal Switching Point 66 represents a subscriber who has moved to "recipient" SSP 66 from TELCO "donor" SSP 34, the subscriber's directory number, say 613 763 1111, being ported from the TELCO's SSP switch 34 indicates that the subscriber's number has been "ported".

It is proposed that, when a subscriber transfers from the TELCO network to the CLEC network, and the subscriber's directory number is to be ported, the CLEC service provider notifies the NPAC which informs the TELCO and other LECs. The TELCO makes a corresponding entry in the LNP database 52 linking the subscriber's ported directory number (613 567 1111) with the Location Routing Number (LRN) of the recipient SSP 66. As before, the end office SSPs will need to be provisioned to take appropriate action when an attempt is made to place a call to the ported directory number. Several options are available for such provisioning, including setting a Termination Attempt Trigger (TAT) at the donor SSP 34; or a PODP trigger at each originating office; or using switch-based call-forwarding. The preferred option, which will now be described in detail, uses PODP triggers at the originating SSPs. Thus, when recipient switch 66 receives the ported directory number, the SCP 50 is notified as before and makes an entry in LNP database 52 using the number 613 763 1111 as a pointer to the Location Routing Number of recipient switch 66. (The CLEC SSPs may also do so, but that is of no concern for the purposes of this description.) Also, the originating end office SSPs 52, 54 and 56 are notified and each sets a PODP trigger so that all subsequent calls to directory numbers beginning 613 763 will cause the switch to query the SCP 50 for instructions before completing the call.

When a caller 52 at originating SSP 30 attempts to place a call to a directory number beginning 613 763, the PODP trigger interrupts call processing and causes SSP 30 to send a TCAP query to the SCP 50 via STP 40. The TCAP query includes the dialled directory number 613 763 XXXX. When the SCP 50 receives the TCAP query, it accesses the LNP database 52. If the SCP 50 does not find the dialled digits because the number has not been ported, it simply returns the same ten digits to the originating SSP 30. When it receives the same ten dialled digits, SSP 30 includes them in the IAM as the Called Number and routes the call in the normal way via SSPs 32, 34 and 58.

If the caller 52 attempts to place a call to the ported directory number 613 763 1111, SSP 30 interrupts the call processing and sends a TCAP query as before. In this case, the SCP 50 finds the ported directory number as a pointer to the LRN of recipient SSP 66 and returns this ten digit LRN instead. Upon receipt of a different set of ten digits, the SSP 30 does not "know" that the number has been ported but only that the dialled number has been forwarded or redirected to the number represented by the new set of ten digits. Consequently, SSP 30 places the original ten dialled digits (the ported directory number) into the Initial Address Message as the "Original Called Number" and places the new set of ten digits, i.e. the LRN, into the Initial Address Message as the "Called Party Number". The SSP 30 then routes the call to recipient office 66 via SSPs 32, 34 and 58. These intervening switches 32, 34 and 58 will not query the SCP 50 because they do not initiate queries where the "Called Party Number" is a Location Routing Number.

When the call reaches the Access Tandem SSP 58, which is the final SSP before the call crosses the boundary 64 between the TELCO network and the CLEC network, the Initial Address Message must be converted into a form recognizable by the SSPs 66 and 68 and the STP 72 in the CLEC network, i.e. with the LRN as the "Called Party Number" and the original dialled digits or ported directory number as the Generic Address Parameter. It should be noted that the SMP 68 has a database listing Location Routing Numbers of the TELCO SSPs and the CLEC SSPs. When the call arrives at the Access Tandem SSP 58, the latter sends a standard Initial Address Message to the ISUP MP module 90 via STP 40. When the ISUP module 90 receives the Initial Address Message, it consults its listing to determine whether or not the call is passing across the boundary 64 and so requires conversion and, if so, in which direction. Recognizing that the LRN of SSP 66 is in the CLEC network, the ISUP module 90 will convert the Initial Address Message by transferring the ten digits of the Original Called Number to the Generic Address Parameter and setting a Forward Call Indicator flag to show, as before, that the dialled number has been translated. When the call arrives at the recipient end office 66, its IAM will have the standard format for a ported number call, i.e. with the LRN as the Called Party Number, the ported directory number as the Original Called number and the FCI flag set. As before, the recipient office 66 would recognize that the Called Party Number was its own LRN and use the digits from the Generic Address Parameter to complete the call.

Had the subscriber moved from the CLEC network to the TELCO network, for example from SSP 66 to SSP 34, and ported the directory number, the conversion procedure would work in reverse for calls placed to the ported number from the CLEC network. The TELCO would arm a TCAP trigger (PODP or TAT) at the recipient SSP for each directory number ported into its network. Thus, the ISUP Mediation module 90 would recognize that the Initial Address Message contained an LRN for a TELCO SSP and would cancel the FCI flag and transfer the ten digits from the Generic Address Parameter to the Original Called Number parameter. The TELCO Access Tandem SSP would then route the call to the recipient SSP 34 using its LRN and the recipient SSP 34 would query the SCP 50 for instructions to complete the call. The SCP 50 would send back the original dialled digits as the Called Party Number and the recipient SSP 34 would use them to complete the call to the ported number.

As mentioned previously, it would be possible to use a Termination Attempt Trigger (TAT) at the donor SSP switch 34 instead of a PODP trigger at the originating SSPs. In such a case, when caller 52 at originating SSP 30 dialled the ported directory number, the sequence of events would be as follows:

1. Originating end office SSP 30 would route the call to donor SSP 34.
2. A Termination Attempt Trigger (TAT) at SSP 34 would cause a TCAP query to be sent to the Service Control Point (SCP) 50 vial link 62, Signal Transfer Point 40 and link 48.
3. The SCP 50 would access its LNP database (LNP-DB) 42 to obtain the corresponding LRN for recipient SSP 66.
4. The SCP 50 would return the LRN in place of the original dialled digits for inclusion in the IAM as the Called Party Number so that the call would be treated as redirected to the LRN. (If the directory number were, in fact, vacant, the SCP 50 would instruct donor SSP 34 to terminate and provide the appropriate announcement).
5. On receipt of the response from the SCP 50, the donor SSP 34 would compose a traditional ISUP Initial Address Message (IAM), including the LRN information as the Called Party Number parameter and including the original dialled (ported) number in the as the Original Called Number. The donor SSP 34 would send the IAM to Access Tandem SSP 58 via STP 40 to set up the call on T1 trunk 60.
5. The Access Tandem SSP 44 would route the call to the recipient SSP 66 via trunk 84 and, in order to do so, would send an ISUP IAM to ISUP Mediation Point module 90.
6. The ISUP MP module 90 would detect that the IAM belonged to a reserved LRN and generate a new LRN-IAM containing the LRN, Generic Address Parameter (GAP) and set a Forward Call Information (FCI) flag described above, in essence transferring the Original Called Number to the Generic Address Parameter. The ISUP MP module 90 would then send the LRN IAM to the recipient SSP 66 via CLEC STP 72.
7. On receipt of the LRN-IAM, the recipient SSP 66 would recognize its LRN as the Called Party Number and complete the call to the ported number appearing in the Generic Address Parameter. In order to do so, the SSP 66 would query its own SCP 80 for instructions or, perhaps, access its own look-up tables for call-completion instructions.

It should be noted that the LRN-IAM is formulated by the ISUP-MP module 90, rather than by the donor SSP 34 or by the originating SSP 30. Hence, SSPs 36 and 34 at the originating end offices do not require modifications to their call processing software, which results in a reduced costs.

Each of these two different methods has advantages and disadvantages. The method using TAT triggers queries on individual ported numbers and may be preferred where few numbers have been ported. The method using PODP triggers queries on all NPA NXX numbers (10,000 DNs) corresponding to a ported number and may be preferred where many number sin a particular office have been ported.

As indicated previously, it would be possible to implement the invention without using TAT or PODP triggers but rather by means of switch-based call forwarding, in which case, when the subscriber transferred, the donor SSP would assign call forwarding to the ported number, with the Location Routing Number of recipient SSP 66 as the "forwarded to" number. Subsequently, when it received a call for the ported directory number, the donor SSP 34 would return a "call-forwarded" message to the originating SSP 30 with the LRN of recipient SSP 66 as the number to which the call was redirected. The originating SSP 30 would then construct its IAM with the LRN as the Called Party Number and the original dialled digits as the Original Called Number and route the call. As before, conversion would take place at the boundary 64, to convert the Original Called Number to the Generic Address Parameter and set an FCI flag.

Where the ported number is transferred from the CLEC network seeks to place a call to the ported number, it is possible to handle the call without involving the CLEC network. For particulars of a redirection scheme to handle such redirection, the reader is directed to copending patent application Ser. No. 08/690,650 filed concurrently herewith.

Although the above-described embodiments use the Location Routing Number as the network address of the recipient switching unit or node, it is envisaged that other forms of network address might be used instead, such as the so-called Carrier Portability Code (CPC) or the "Name and Address" scheme, both of which were considered by the ICC as an alternative to the proposed LRN LNP procedure described herein. In the CPC scheme, each LEC has a unique 3-digit identifier equivalent to a NPA number, a NPA-NXX-XXXX number being replaced by a CPC-NXX-XXXX number. For non-ported numbers, the CPS identifier is the NPA code. In the "Name and Address" scheme, each subscriber has a "address" which is a Network Node Address, e.g. NPA NYY-YYYY. In embodiments of the present invention, therefore, the SMP could use the CPC address or the Network Node Address instead of the LRN when routing calls within the TELCO network and convert to a LRN at the boundary.

For convenience, the foregoing description refers to network nodes as performing various functions. It should be appreciated that the network nods are logical network entities associated with physical network elements such as switching units which will actually carry out the functions.

One skilled in the art will also recognize that the invention is not limited to the specific architectures and call routing procedures described above which are by example only, but embraces other architectures and procedures comprehended by the appended claims.

What is claimed is:

1. In a telephone network having a plurality of network nodes each having a unique network address and using a Signalling System No. 7 out-of-band signalling system for call setup and routing, said signalling system employing Initial Address Messages for controlling routing of the calls, said Initial Address Messages including selected ones of several parameters, including a Called Party Number, an Original Called Party Number, a Generic Address Parameter Number and a Forwarded Call Indicator, a method of providing directory number portability enabling routing of a call to a directory number that has been transferred from a donor switching unit at a donor network node in said telephone network to a recipient switching unit at a recipient network node in a second network controlled by a different service provider, the method including the steps of:

(i) at an originating switching unit in the telephone network, associating with a call to the ported directory number an Initial Address Message comprising the network address of the recipient network node as the Called Number and the ported directory number as the Original Called Number;

(ii) at a boundary between the telephone network and the second network, converting the Initial Address Message by making the Original Called Party number a Generic Address Parameter and setting a Forwarded Call Indicator flag to indicate that the Called Number as originally-dialled has been translated;

(iii) routing the call into the second network using the converted Initial Address Message; and (iv) at the recipient switching unit, detecting the Forwarded Call Indicator flag and completing the call to the directory number in the Generic Address Parameter Number field.

2. A method as claimed in claim 1, in a telephone network comprising switching units having Public Office Dialling Plan triggers for interrupting call processing and initiating queries to a Service Control Point having access to a central database, the method further comprising the steps of, when the directory number is ported to the recipient network node, making an entry in said central database linking the ported directory number with the network address of the recipient network node and setting Public Office Dialling Plan (PODP) triggers at originating switching units, the step of associating the Initial Address Message with a call to the ported directory number including the steps of interrupting call processing at the PODP trigger in the switching unit processing the call to the ported directory number, querying the central database with the ported directory number, retrieving from the database the corresponding network address of the recipient network node and, upon receipt of the network address at the originating switching unit, assembling said Initial Address Message.

3. A method as claimed in claim 1, in a telephone network comprising switching units having Termination Attempt triggers for interrupting call processing and initiating queries to s Service Control Point having access to a central database, the method further comprising the steps of, when the directory number is ported to the recipient switching unit, making an entry in the central database linking the ported directory number with the network address of the recipient network node and setting a Termination Attempt Trigger at the donor switching unit, the step of associating the Initial Address Message with a call to the ported directory number including the steps of, at an originating switching unit attempting to place a call to the ported directory number, routing the call to the donor network node, at the donor switching unit, interrupting call processing at the TAT trigger and querying the central control unit with the ported directory number, at the central control unit, using the ported directory number to retrieve the network address of the recipient network node and returning the network address to the donor switching unit, upon receipt of the network address at the donor switching unit, returning the network address to the originating switching unit as a redirection number, at the originating switching unit incorporating the network address and ported directory number into the Initial Address Message.

4. A method as claimed in claim 1, further comprising the steps of, when the directory number is ported to the recipient switching unit, making an entry at the donor network node identifying the ported directory number as redirected number and associating the network address of the recipient network node as the number to which calls to the ported directory number are to be redirected, the step of associating the Initial Address Message with a call to the ported directory number including the steps of, at an originating node, routing the call to the donor network node, at the donor network node, returning to the originating node a redirection message with the network address as the number to which the call is to be redirected and, upon receipt of the redirection message at the originating node, incorporating the network address and ported directory number into the Initial Address Message.

5. In a telephone network having a plurality of network nodes each having a unique network address and using a Signalling System No. 7 out-of-band signalling system for call setup and routing, said signalling system employing Initial Address Messages for controlling routing of the calls, said Initial Address Messages including selected ones of several parameters, including a Called Party Number, and an Original Called Party Number, a method of providing directory number portability enabling routing of a call to a directory number that has been transferred from a donor network node in said telephone network to a recipient network node in a second network controlled by a different service provider, including the steps of:

upon transfer of the directory number from a donor switching unit at the donor network node to a recipient switching unit at the recipient network node;

(i) storing at a database associated with a central network control unit data linking the directory number with a network address of the recipient network node;

(ii) setting at each originating network node a point-in-call trigger actuable when the switching unit of the originating network node is required to process a call to the ported directory number, the trigger causing a query to be sent to the central network control unit;

when subsequently one of said originating network node switching units attempts to place a call to the ported number;

(iii) at said originating network node switching unit, interrupting call processing upon actuation of said trigger and sending to said central network unit a signalling message including said ported directory number;

(iv) at said central network unit, determining whether or not said directory number is present in said database and, in the event that said directory number is present, returning to said originating network node switching unit said network address of said recipient network node;

(v) at said originating network node switching unit, constructing an Initial Address Message with the network address as the called party number and the ported directory number as the original called number and routing the call to the network address; and (vi) at the recipient network node, detecting a Forwarded Call Indicator flag and completing the call to the directory number in a Generic Address Parameter field.

6. A method as claimed in claim 5, wherein the originating network node switching unit routes the call to a network access element, the method further comprising the steps of:

(vii) at the network access element, converting the Initial Address Message by making the Original Called Party number the Generic Address Parameter and setting the Forwarded Call Indicator flag to indicate that the Called Number as originally-dialled has been translated; and (viii) routing the call into the second network using the converted Initial Address Message.

7. A telephone network having a plurality of network nodes each having a unique network address and using a Signalling System No. 7 out-of-band signalling system for call setup and routing, said signalling system employing Initial Address Messages for controlling routing of the calls, said Initial Address Messages including selected ones of several parameters, including a Called Party Number, an Original Called Party Number, a Generic Address Parameter Number and a Forwarded Call Indicator, the network comprising:

(i) means for associating with a call to the ported directory number an initial address message comprising the network address of a second network node in a second network as the Called Number and the ported directory number as the Original Called Number;

(ii) an access element controlling access between the telephone network and said second network and comprising means for converting the Initial Address Message by making the Original Called Party number a Generic Address Parameter and setting a Forwarded Call Indicator flag to indicate that the Called Number as originally-dialled has been translated; and means for routing the call into said second network using the converted Initial Address Message; and (iii) means at the recipient switching unit for detecting the Forwarded Call Indicator flag and completing the call to the directory number in the Generic Address Parameter field.

* * * * *

UNITED STATES PATENT AND TRADEMARK OFFICE
CERTIFICATE OF CORRECTION

PATENT NO. : 5,867,570
DATED : February 2, 1999
INVENTOR(S) : Bargout et al

It is certified that error appears in the above-identified patent and that said Letters Patent is hereby corrected as shown below:

On the title page: Item [73] should read -- Northern Telecom Limited, Montreal, Canada and Bell Canada, 1050 Beaver Hall Hill, Montreal, Quebec --.

Signed and Sealed this

Twenty-first Day of December, 1999

Attest:

Q. TODD DICKINSON

Attesting Officer

Acting Commissioner of Patents and Trademarks